June 28, 1960 E. E. BOYER 2,943,281

FREQUENCY SENSITIVE CIRCUIT PROVIDING SPEED ERROR SIGNALS

Filed Dec. 31, 1953

INVENTOR.
ERWIN E. BOYER
BY Robert C. Smith
ATTORNEY

United States Patent Office 2,943,281

Patented June 28, 1960

2,943,281

FREQUENCY SENSITIVE CIRCUIT PROVIDING SPEED ERROR SIGNALS

Erwin E. Boyer, South Bend, Ind., assignor to Bendix Aviation Corporation, South Bend, Ind., a corporation of Delaware Filed Dec. 31, 1953, Ser. No. 401,686

2 Claims. (Cl. 333—75)

This invention relates to frequency sensitive circuits and more particularly to such a circuit having utility as a source of speed error signals for an electrical speed governing system.

There are many applications in the field of speed control wherein it is desired to control speed within close limits over the operating range of the rotating device to be controlled while tolerating an absolute minimum of speed above the established limits of said device. In the present system the output voltage, which is a speed error signal, becomes greatly increased when the input signal exceeds a frequency corresponding to maximum rotational speed of the device controlled and thus provides insurance against overspeeding. This circuit may be applicable in many situations where it is desired that a frequency of input signal above a certain value be reflected by an abnormally high output voltage; however, it is particularly appropriate for use as a speed control or governor because of its particular output characteristics, its simplicity, and its inherent reliability.

Accordingly, it is an object of the present invention to provide an electrical governing circuit which will provide an effective speed error signal over the operating range of the device with which it is associated, and a greater than normal speed error signal in case of overspeeding.

It is another object of the present invention to provide a frequency sensitive circuit having great reliability and resistance to damage from heat and vibration.

It is a further object of the present invention to provide a frequency sensitive circuit which will accomplish the above objects and yet is capable of being manufactured in a very small package.

Other objects and advantages will appear from the following description and drawings in which.

Figure 1:
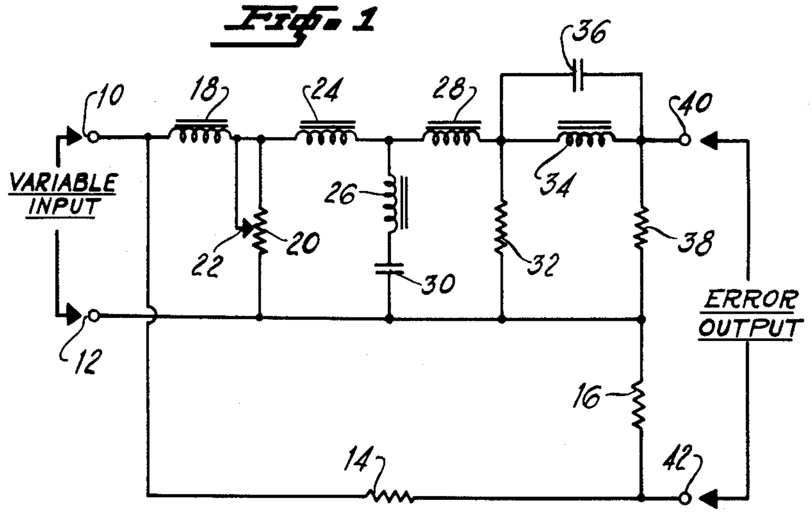
Figure 1 is a schematic drawing showing the arrangement of the electrical components of the frequency sensitive circuit.

Referring now to Figure 1, a variable input signal is applied across terminals 10 and 12, this input signal being such that the voltage is directly proportional to the frequency and the frequency is directly proportional to the speed of the rotating device governed. This input signal is supplied to two parallel paths; one a voltage dividing network including resistors 14 and 16 and the other a low-pass filter system to be discussed below. Since the input voltage is directly proportional to the frequency of the input signal, a voltage directly proportional to the actual rotational speed appears across resistor 16. This characteristic appears on the graph of Figure 2 in which it will be observed that $E_{16}$ is shown as a straight line rising in direct proportion with frequency, and hence, rotational speed.

The low-pass filter system to which the variable input is applied consists in part of an inductance-resistance circuit containing an inductance 18 and a potentiometer 20 which have values such that, at all speeds greater than 30% of the critical input frequency (turbine idle speed), the Q of the circuit is greater than seven. With the values so chosen, the voltage measured across potentiometer 20 becomes substantially uniform and independent of frequency. The amplitude of the voltage taken across potentiometer 20 is adjustable by means of slider 22 which varies the magnitude of the output signal of the filter system.

The voltage selected on potentiometer 20 is supplied to an M-derived low pass filter section composed of inductances 24, 26 and 28, a capacitor 30, and a resistor 32. The values of these components have been chosen for a particular application so that the value of M is in the vicinity of 0.20; however, as requirements vary the value of M may vary accordingly. The function of this filter is to give a sharp attenuation to frequencies representing speeds beyond a maximum rotational speed. The voltage output of this circuit provides the sharp attenuation required, but along the high end of the speed range the voltage makes an undesirable increase with frequency which, if not compensated for, would create spurious error signals. This compensation is supplied by a tuned circuit composed of inductance 34 and capacitor 36. This circuit has a frequency response which effectively counteracts the tendency of the M-derived filter to produce a peak in its voltage output within the usable speed range of the governed device; hence, the combined voltage of the three circuits, i.e. the inductance-resistance network, the M-derived filter, and the tuned circuit will be a voltage appearing across a resistor 38 substantially independent of input frequency between 30% and 100% of maximum speed.

Figure 2:
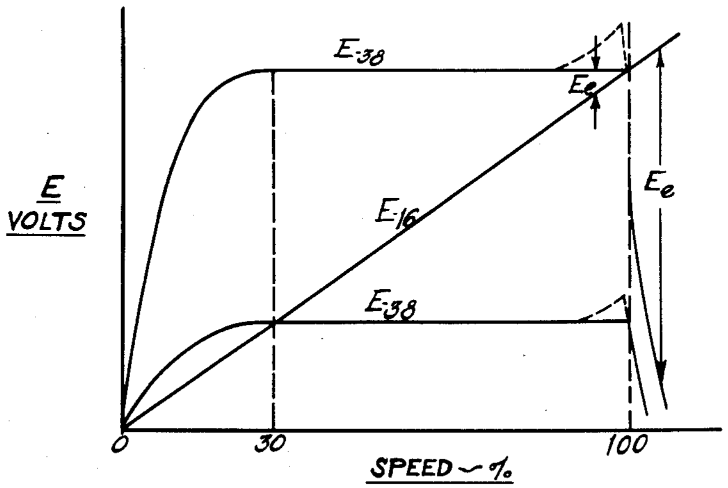
Figure 2 is a graph showing the manner in which voltage output varies with frequency input, and therefore, rotational speed.

This characteristic is graphically portrayed in Figure 2. It will be noted that the curves marked $E_{38}$ are flat over the range of input frequency between 30% and 100% of maximum speed. The dotted sections represent the portions removed by the action of the tuned circuit. While two such curves are shown, actually a whole family could be drawn at different voltage levels as established by slider 22 on potentiometer 20. At any voltage level, however, the curves would be essentially flat over the same range of frequency input. At any arbitrary setting of slider 22 a speed reference voltage appears across resistor 38, which is compared with an actual speed signal across resistor 16, the actual speed voltage characteristic being shown on line $E_{16}$. At any speed, a discrepancy between these two values will result in an output voltage appearing across terminals 40 and 42 having a polarity varying with the direction of speed error, and a magnitude proportional to the amount of the discrepancy. This voltage is used in a part of the system not shown to correct the speed of the governed device. At speeds greater than 100% of maximum, this error voltage, because of the greatly attenuated reference voltage, is sharply increased. A certain threshold error voltage being required to cause a speed correction, this correction is attained with much less speed fluctuation above actual maximum operating speed than would occur during operation over the allowable speed range. Reference to Figure 2 will show that the error voltage ($E_e$) is much larger at a point slightly above the selected maximum speed than it is below maximum. The polarities are, of course, opposite because the error voltage appearing on the left is indicative of an actual speed below that requested while that on the right shows overspeed, not only with respect to the request but with respect to the operational limits of the turbine.

Although the invention herein disclosed is shown in connection with a single embodiment, modifications may be made to suit requirements.

I claim:

1. In an electrical speed governing circuit having input terminals adapted to receive an input signal varying in frequency with a speed sensed and in voltage as a function of said frequency; means producing a speed reference signal comprising, in series, a resistance-inductance network connected to said input terminals and having a Q of sufficiently high value that the voltage output of said network is substantially uniform and independent of frequency when an input signal varying in frequency and in voltage as a function of said frequency is applied thereto, an M-derived filter section producing a sharp attenuation in signals of frequency values representative of speed in excess of the desired value, and a parallel resonant circuit for discriminating against a voltage peak produced at the output of said M-derived filter section; means producing a control signal varying with the speed sensed comprising a voltage dividing network connected to said input terminals in parallel with said speed reference signal producing means; and means comparing the output voltages of said speed reference and speed signal producing means to produce a speed error signal having a greatly increased magnitude above said desired speed value.

2. In an electrical speed governing circuit having input terminals adapted to receive an input signal varying in frequency with a speed sensed and in voltage as a function of said frequency; means producing a speed reference signal comprising, in series, a high-Q inductance-resistance network connected to said input terminals, said inductance-resistance network having a voltage output which is substantially uniform and independent of frequency when an input signal varying in frequency and in voltage as a function of said frequency is applied thereto, an M-derived low pass filter section, and a parallel resonant circuit; means producing a control signal varying with the speed sensed comprising a voltage dividing network connected to said input terminal in parallel with said speed reference signal producing means, and means comparing the output voltages of said speed reference and speed signal producing means to produce a speed error signal having a greatly increased magnitude above a particular speed value.

References Cited in the file of this patent

UNITED STATES PATENTS

| | | |
|---|---|---|
| 1,416,061 | Pupin et al. | May 16, 1922 |
| 1,772,509 | Blye | Aug. 12, 1930 |
| 2,247,898 | Wheeler | July 1, 1941 |
| 2,358,394 | Haug | Sept. 19, 1944 |
| 2,413,263 | Suter | Dec. 24, 1946 |
| 2,510,296 | Root | June 6, 1950 |
| 2,541,666 | Quinn | Feb. 13, 1951 |
| 2,605,358 | Neher | July 29, 1952 |
| 2,682,031 | Pocock | June 22, 1954 |

OTHER REFERENCES

Shea: Transmission Networks and Wave Filters, 1929, page 291.